Patented Apr. 27, 1948

2,440,602

UNITED STATES PATENT OFFICE 2,440,602

MANUFACTURE OF DICHLOROPHENOLS

Reginald Thomas Foster, Birkenhead, and Nicholas Bennett, Ditton, England, assignors to Imperial Chemical Industries Limited, a corporation of Great Britain No Drawing. Application July 25, 1945, Serial No. 607,082. In Great Britain April 21, 1943

Section 1, Public Law 690, August 8, 1946
Patent expires April 21, 1963

5 Claims. (Cl. 260—623)

This invention relates to improvements in the manufacture of chlorinated organic compounds, and more particularly to the manufacture of dichlorophenol.

It is known that 2.4-dichlorophenol can be prepared, together with small amounts of the 2.6 isomer, by passing chlorine into molten phenol. In carrying out this process, however, difficulties arise in that other chlorophenols are formed which interfere with the production of a product of high purity. For example, if too much chlorine is allowed to react with the phenol, trichlorophenol is obtained which is difficult to separate. According to Holleman (Rec. Trav. Chim., 37, 97) it is preferable, in preparing 2.4-dichlorophenol, to prepare o-chlorophenol, and to submit this to chlorination, care being taken to introduce not more than one molecule of chlorine per molecule of o-chlorophenol.

We have now found that in chlorinating molten phenol the setting point of the material undergoing chlorination at first decreases, and then rises at the chlorine content increases, passing through a maximum value when the chlorine content is substantially the optimum for the formation of dichlorophenol. Chlorination beyond this point produces a composition containing trichlorophenol from which the dichloro body cannot readily be separated by distillation, while chlorination to a less extent means a diminished yield of the required compound. Thus by carrying out the chlorination up to this maximum in value of the setting point, and subsequently submitting the chlorinated material to fractional distillation, a friction consisting essentially of dichlorophenol is obtained in a very convenient manner. This product comprises the 2.4-isomer, together with only a very small proportion of the 2.6-isomer.

According to the present invention, therefore, we provide a process for the production of dichlorophenol which comprises subjecting molten phenol to the action of chlorine until a reaction product containing dichlorophenol is formed having a maximum setting point. Advantageously the chlorinated material is subsequently submitted to fractional distillation so as to isolate a fraction consisting essentially of 2.4-dichlorophenol.

By a maximum setting point we mean a setting point greater than that of either of the reaction products obtained in a like manner but having significantly different setting points and respectively slightly greater and slightly less chlorine contents.

The course of the chlorination of the phenol can be followed very conveniently by periodically withdrawing samples of the material undergoing chlorination and determining their setting point. This may be done by pouring the molten samples as it is withdrawn into a glass tube fitted with an air jacket, a stirrer, and a thermometer, and stirring the material while allowing it to cool. Some supercooling will in general occur, and then as the sample sets a temporary rise in temperature will occur; the highest point so reached may be taken as the setting point. Determined in this way the setting point will rise sharply as the amount of combined chlorine approaches 2 atoms per molecule of phenol, and reach a maximum of approximately 37° C. when the optimum chlorine content is reached. Substantial differences occur in the setting point, and in the behaviour of the product on distillation, if amounts of chlorine are employed differing from the optimum only to a small extent. Thus if the chlorination is carried up to a point where the setting point has risen above 34° C., corresponding to a chlorine content of the product between 2.0 and 2.25 atoms of chlorine per molecule, dichlorophenol can be isolated by fractional distillation in amount greater than 80% of that theoretically obtainable from the phenol used, while if chlorination is continued until 2.4 atoms of chlorine per molecule have been introduced, the setting point falls to 26° C. and fractional distillation in a similar manner yields only 55% of the theoretical amount of dichlorophenol. Premature cessation of the chlorination will also give a product of lower setting point and a lower yield of the desired product.

Thus in one method of preparing dichlorophenol according to our invention, phenol is melted in a reaction vessel fitted with a condenser, heating and cooling means, an inlet for chlorine, and an outlet for hydrogen chloride. Chlorine is then passed in, and initially is readily absorbed by the phenol with evolution of heat. The temperature may be allowed to rise, for example, to a temperature between 80° C. and 100° C. and cooling is then employed to prevent further increase. An approximate guide to the degree of chlorination can be obtained by measuring the quantity of chlorine passed into the reaction mixture, and when this quantity approaches the optimum, for example, about 3.8 to 3.9 atoms of chlorine per molecule of phenol, samples are withdrawn at intervals, and their setting points determined as set out above. Chlorination is continued meanwhile until the setting points of the last sample withdrawn exceeds 34° C., and preferably until it reaches 36° C.; further introduction of chlorine is then stopped. Instead of withdrawing samples and determining the setting point on each batch of phenol chlorinated, the setting point may be correlated with the density at a given temperature and the chlorination continued until a product having a predetermined density is obtained. Thus chlorination to a setting point above 34° C. corresponds to chlorination to a density at 40° C. between 1.40 and 1.42 gm./ml.

The chlorinated product so obtained is a crude dichlorophenol which may without further treatment be useful for some purposes. However, preferably it is purified by fractional distillation, whereby it is possible to separate it from substantially all of the other chloro bodies present. Thus by submitting it to fractional distillation at 110 mm. pressure and collecting the fraction boiling between 145° C. and 150° C., 2.4-dichlorophenol containing only a small proportion of the 2.6 isomer is obtained in yields of 85% to 90% while there is left in the still a residue consisting of the 2.4 and 2.6 isomers, together with any 2.4.6-trichlorophenol which may be present.

The following example illustrates but does not limit our invention, all parts being parts by weight:

Example

A reaction vessel was employed fitted with heating and cooling means, an inlet for chlorine, and outlet for hydrogen chloride through a condenser, and with means for withdrawing samples of reaction product.

250 parts of phenol were charged into the vessel and melted. Heating was then stopped, and the introduction of chlorine commenced at the rate of 19 parts per hour. Evolution of heat took place and the temperature was allowed to rise to 80° C. Cooling was then commenced and the temperature was thereafter maintained between 80° C. and 90° C. for the remainder of the chlorination. When approximately 3.8 atoms of chlorine per molecule of phenol had been passed into the phenol, small samples of the reaction mixture were withdrawn at short intervals and the setting point of each sample was determined forthwith. When a sample was obtained having a setting point of 37° C. chlorination was stopped. The reaction mixture was then submitted to fractional distillation at a pressure of 110 mm. of mercury and the fraction distilling between 145° C. and 147° C. was collected. 390 parts of substantially pure 2.4-dichlorophenol were thus obtained melting between 39° C. and 40° C.

We claim:
1. A process for the production of a dichlorophenol which comprises chlorinating molten phenol with chlorine up to the stage where a reaction product containing dichlorophenol is formed having a maximum setting point.

2. A process for the production of a dichlorophenol which comprises chlorinating molten phenol with chlorine up to the stage where a reaction product containing dichlorophenol is formed having a maximum setting point, and subsequently subjecting the chlorinated reaction product to fractional distillation so as to isolate a fraction consisting essentially of 2.4-dichlorophenol.

3. A process for the production of a dichlorophenol which comprises subjecting molten phenol at a temperature between 80° C. and 100° C. to the action of chlorine until a reaction product containing dichlorophenol is formed having a maximum setting point.

4. A process according to claim 3 in which the molten phenol is chlorinated until a reaction product is formed having a setting point above 34° C.

5. A process according to claim 3 in which the molten phenol is chlorinated until a reaction product is formed having a setting point of approximately 37° C.

REGINALD THOMAS FOSTER.
NICHOLAS BENNETT.

REFERENCES CITED

The following references are of record in the file of this patent:

Chemical Abstracts, vol. 12, pages 1542–3 (1918), Abstracting an article of Hollman in Rec. trav. chim., vol. 37, pages 96–107 (1918); ibid, vol. 26, page 1258 (1932), abstracting an article of Lande in Rec. trav. chim., vol. 51, pages 98–113 (1932); ibid., vol. 31, column 4967 (1937), abstracting an article of Chulkiv in Org. Chem. Ind. U. S. S. R., vol. 3, pages 97–101 (1937).